(12) United States Patent
Lomazoff et al.

(10) Patent No.: US 11,104,790 B1
(45) Date of Patent: *Aug. 31, 2021

(54) TRANSIENT POLYMER BLENDS

(71) Applicant: MORSECORP, Inc., Cambridge, MA (US)

(72) Inventors: Adam Lomazoff, Waltham, MA (US); Matthew DiLeo, Boston, MA (US)

(73) Assignee: MORSECORP Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,034

(22) Filed: Feb. 19, 2020

Related U.S. Application Data

(63) Continuation of application No. 16/543,520, filed on Aug. 17, 2019.

(60) Provisional application No. 62/765,121, filed on Aug. 17, 2018.

(51) Int. Cl.
| | | |
|---|---|---|
| *C08L 61/18* | (2006.01) | |
| *C08G 63/08* | (2006.01) | |
| *C08L 55/02* | (2006.01) | |
| *C08K 5/00* | (2006.01) | |
| *C08K 5/02* | (2006.01) | |
| *C08K 5/55* | (2006.01) | |
| *C08K 5/01* | (2006.01) | |

(52) U.S. Cl.
CPC ............. *C08L 61/18* (2013.01); *C08G 63/08* (2013.01); *C08L 55/02* (2013.01); *C08K 5/0016* (2013.01); *C08K 5/01* (2013.01); *C08K 5/02* (2013.01); *C08K 5/55* (2013.01)

(58) Field of Classification Search
None
See application file for complete search history.

(56) References Cited

U.S. PATENT DOCUMENTS

| | | | |
|---|---|---|---|
| 5,384,019 A | 1/1995 | Keating | |
| 7,923,194 B2 | 4/2011 | Kohl et al. | |
| 8,871,893 B2 | 10/2014 | Phillips | |
| 8,956,805 B2 | 2/2015 | Kohl et al. | |
| 8,999,629 B2 | 4/2015 | Kohl et al. | |
| 9,604,726 B2 | 3/2017 | Fourie | |
| 2005/0127242 A1 | 6/2005 | Rivers, Jr. | |
| 2006/0235130 A1 | 10/2006 | Hanner | |
| 2011/0121138 A1 | 5/2011 | Walsh et al. | |
| 2014/0242623 A1* | 8/2014 | Phillips | C08F 12/08 435/18 |
| 2015/0064581 A1 | 3/2015 | Unlu et al. | |
| 2015/0336652 A1 | 11/2015 | Smith | |
| 2017/0081011 A1 | 3/2017 | Matthews et al. | |
| 2017/0306199 A1 | 10/2017 | Kohl et al. | |
| 2018/0155483 A1 | 6/2018 | Kohl et al. | |

FOREIGN PATENT DOCUMENTS

WO   WO 2020/033015 A2   2/2020

OTHER PUBLICATIONS

Jay London, "Using Daylight to Make Drones Disappear", Slice of MIT from the MIT Alumni Association, Nov. 6, 2017, 6 pages.

* cited by examiner

*Primary Examiner* — Christopher M Rodd
(74) *Attorney, Agent, or Firm* — Fish & Richardson P.C.

(57) ABSTRACT

Polymer blends are described that are formed from a transient polymer material, a polymer comprising an acrylonitrile group (e.g., ABS, SAN), and/or one or more polyester polymers. For blends in which two or more polyester polymers are blended with a transient polymer material, at least two of the polyester polymers are immiscible with one another, and one of the polyester polymers has a glass transition temperature less than or equal to 0° C. The polymer blends herein can decompose into liquid phase decomposition products upon exposure to a transience reaction trigger in less than 8 hours even at temperatures of less than −20° C.

29 Claims, 3 Drawing Sheets

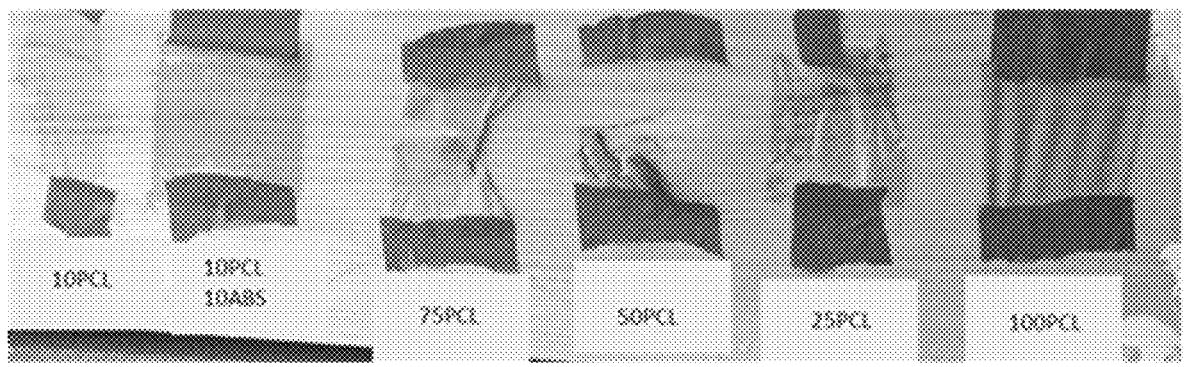
FIG. 2A  FIG. 2B  FIG. 2C  FIG. 2D  FIG. 2E  FIG. 2F
FIG. 3
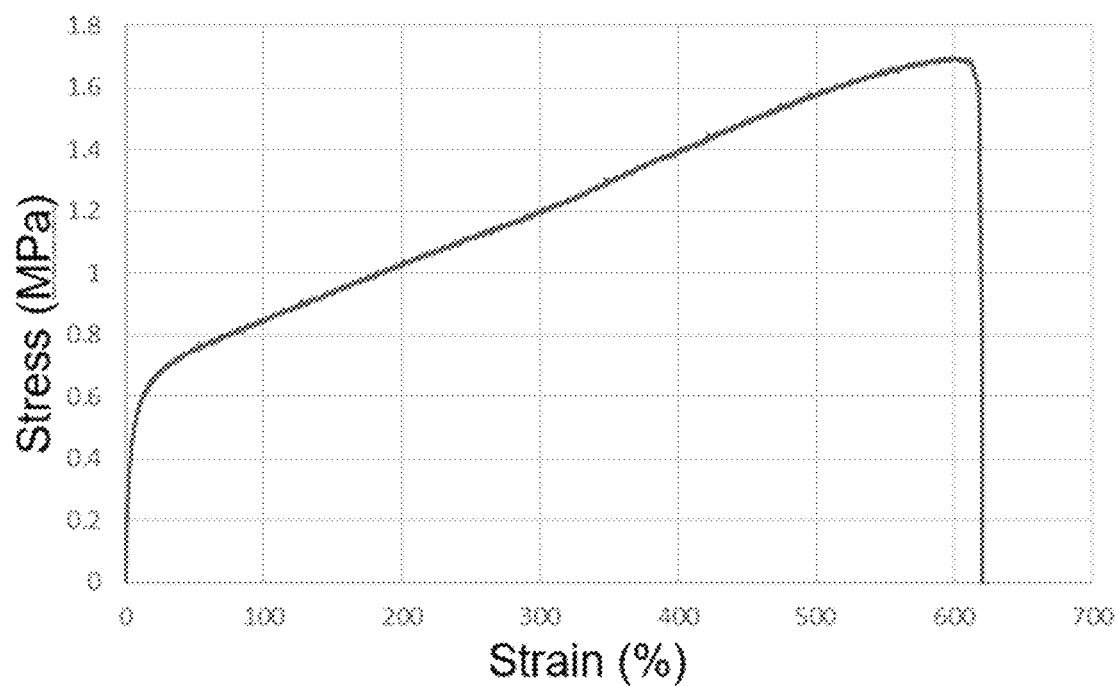

TRANSIENT POLYMER BLENDS

CROSS REFERENCE TO RELATED APPLICATIONS

This application claims the benefit under 35 U.S.C. § 120 as a continuation of U.S. application Ser. No. 16/543,520, titled "TRANSIENT POLYMER BLENDS," filed on Aug. 17, 2019, which claims the benefit under 35 USC § 119(e) to U.S. Provisional Patent Application No. 62/765,121, titled "Mechanical Enhancement of PPHA Transient Polymers via Inclusion of Acrylonitrile Group Polymer Additives," filed on Aug. 17, 2018, each of which is hereby incorporated herein by reference in its entirety.

STATEMENT REGARDING FEDERALLY SPONSORED RESEARCH OR DEVELOPMENT

This invention was made with government support under contract numbers HR0011-16-C-0086, W911QY-16-P-0268, and W911QY-18-C-0120 awarded by the U.S. Department of Defense. The government has certain rights in the invention.

TECHNICAL FIELD

The present disclosure relates generally to transient polymers. Specifically, the present disclosure relates to transient polymer blends.

BACKGROUND

Transient polymers (sometimes referred to as "self-immolating" polymers) are formed from a constituent molecule (e.g., a "monomer" or "repeat unit") that is more stable in a monomer or oligomer form at ambient atmospheric temperatures than in its polymeric form. The upper temperature limit for stability of the polymer molecule, beyond which the polymer molecule depolymerizes, is sometimes referred to as the "ceiling temperature."

SUMMARY

To maintain polymeric molecular stability at temperatures above the ceiling temperature, polymer molecules can include other molecules that can temporarily prevent depolymerization of the polymer molecule above the ceiling temperature. In some examples, these stabilizing molecules can be added to the transient polymer molecule as a terminal group during polymerization. This stabilizing molecule can aid the maintenance of the polymeric form at ambient temperatures.

At the same time, the transient polymer molecule and/or bulk transient polymer material can include a component that, when activated, provides a mechanism by which the stabilizing effect of the added stabilizing molecule is reduced, thus facilitating in situ, spontaneous depolymerization. For example, some transient polymers and some bulk transient polymer materials include a photo acid generator that when activated by some wavelengths of radiation (e.g., infrared (IR) radiation, UV radiation, some wavelengths of visible radiation) can initiate depolymerization of a transient polymer molecule. This type of decomposition weakens the effect of terminal stabilizing groups as the number of polymer molecules increases from chain scission, thus enabling the transient polymer to decompose at temperatures above a ceiling temperature.

Example 1 is a polymer blend comprising a transient polymer material; and one or both of: a polymer that includes an acrylonitrile group or polyester polymer having a glass transition temperature of less than 0° C.

Example 2 includes the subject matter of Example 2, wherein the transient polymer material comprises poly(phthalaldehyde) (PPHA).

Example 3 includes the subject matter of any of the preceding Examples, wherein the polymer that includes the acrylonitrile group comprises acrylonitrile butadiene styrene (ABS) polymer.

Example 4 includes the subject matter of Example 3, comprising from 1 weight % to 33 weight % ABS polymer; and from 80 weight % to 99 weight % transient polymer material, wherein the total of the ABS polymer and the transient polymer material is 100 weight %.

Example 5 includes the subject matter of any of the preceding Examples, wherein the polymer that includes the acrylonitrile group comprises styrene acrylonitrile (SAN).

Example 6 includes the subject matter of any of the preceding Examples, wherein: the polyester polymer comprises a first polyester and a second polyester compositionally different from the first polyester; and the first polyester and the second polyester are immiscible with one another.

Example 7 includes the subject matter of any of the preceding Examples, comprising: from 20 weight % to 98 weight % transient polymer material; from 1 weight % to 25 weight % of a first polyester; and from 1 weight % to 10 weight % of a second polyester compositionally different from the first polyester and immiscible with the first polyester, wherein the total composition is 100 weight %.

Example 8 includes the subject matter of Example 7, wherein the transient polymer material further comprises from 25 weight % to 60 weight % of an ionic liquid plasticizer, a non-ionic liquid plasticizer, or both.

Example 9 includes the subject matter of Example 7, wherein the first polyester and the second polyester are selected from one or more of the following combinations: polycaprolactone (PCL) and polybutyrate adipate terephthalate (PBAT); polycaprolactone (PCL) and polybutylene succinate adipate (PBSA); polylactic acid (PLA) and a copolymer of 3-hydroxybutyrate and 3-hydroxyhexanoate (PBHB); and polylactic acid (PLA) and polybutylene succinate (PBS).

Example 10 includes the subject matter of Example 7, wherein the first polyester has a glass transition temperature of less than 0° C. and the second polyester has a glass transition temperature greater than 0° C., and wherein the first polyester and the second polyester are selected from one or more of the following combinations: polycaprolactone (PCL) and polylactic acid (PLA); polycaprolactone (PCL) and thermoplastic starch (TPS); polylactic acid (PLA) and polybutylene succinate adipate (PBSA); polyhydroxybutyrate (PHB) and polyether sulfone (PES); and polycaprolactone (PCL) and poly(3-hydroxybutyrate-co-3-hydroxyvalerate) (PHBV).

Example 11 includes the subject matter of any of Examples 1-6, wherein: the transient polymer material comprises: from 20 weight % to 50 weight % polyphthalaldehyde (PPHA); from 30 weight % to 48 weight % of an ionic liquid plasticizer; from 10 weight % to 25 weight % of a phthalate plasticizer; from 1 weight % to 5 weight % of a photo-active material comprising 4-Isopropyl-4'-methyldiphenyliodonium Tetrakis(pentafluorophenyl)borate and anthracene; the polymer that includes the acrylonitrile group comprises from 1 weight % to 10 weight % of acrylonitrile butadiene styrene; and the polyester polymer comprises from 5 weight % to 20 weight % of poly(caprolactone), and wherein the total composition comprises 100 weight % of the polymer blend.

Example 12 includes the subject matter of Example 7, wherein the polymer blend exhibits a yield strength of approximately 0.64 MPa, an elongation to break of approximately 612%, and a stress at elongation to break of approximately 1.68 MPa, and wherein the preceding properties were measured at a strain rate of 100% strain per minute at 20° C.

Example 13 includes the subject matter of any of the preceding Examples, wherein the polymer blend decomposes from a solid phase to a liquid phase upon exposure to a decomposition trigger in a period of less than 8 hours at temperatures below 20° C.

Example 14 includes the subject matter of Example 13, wherein at least 50 weight % of the polymer blend decomposes from a solid phase to a liquid phase in a period of less than 1 hour at a temperature of from 20° C. to 40° C.

Example 15 is a polymer blend comprising: a transient polymer material; a first polyester polymer having a first glass transition temperature of less than 0° C.; and a second polyester polymer compositionally different from the first polyester polymer and immiscible with the first polyester polymer.

Example 16 includes the subject matter of Example 15, wherein the polymer blend decomposes to a liquid phase upon exposure to a decomposition trigger.

Example 17 includes the subject matter of either Example 15 or 16, wherein the transient polymer material comprises poly(phthalaldehyde) (PPHA).

Example 18 includes the subject matter of Examples 15-17, further comprising at least one additional polyester polymer compositionally different from the first and second polyester polymers.

Example 19 includes the subject matter of Example 18, wherein one or more of the second polyester polymer and the at least one additional polyester polymer have a glass transition temperature greater than 0° C.

Example 20 includes the subject matter of Examples 15-19, further comprising from 1 weight % to 10 weight % of an acrylonitrile butadiene styrene polymer, and wherein: the transient polymer material comprises: from 20 weight % to 50 weight % polyphthalaldehyde (PPHA); from 30 weight % to 48 weight % of an ionic liquid plasticizer; from 10 weight % to 25 weight % of a phthalate plasticizer; from 1 weight % to 5 weight % of a photo-active material comprising 4-Isopropyl-4'-methyldiphenyliodonium Tetrakis (pentafluorophenyl)borate and anthracene; the first polyester polymer has a glass transition temperature of less than 0° C. and comprises from 5 weight % to 25 weight %, and the second polyester polymer has a glass transition temperature of less than 10° C. and comprises from 1 weight % to 10 weight %, wherein the total composition comprises 100 weight %.

Example 21 is a polymer blend comprising: a transient polymer material; a first polyester polymer having a first glass transition temperature greater than 0° C.; and a second polyester polymer compositionally different from the first polyester polymer, having a second glass transition temperature greater than 0° C. and immiscible with the first polyester polymer.

Example 22 includes the subject matter of Example 21, wherein the first polyester and the second polyester are selected from one or more of the following combinations: polylactic acid (PLA) and polyhydroxybutyrate (PHB); and polylactic acid (PLA) and thermoplastic starch (TPS).

BRIEF DESCRIPTION OF THE DRAWINGS

FIG. 2A-2F illustrates transience experimental results of various compositions of transient polymer blends that include a poly(phthalaldehyde)-based transient polymer material, polycaprolactone, and in one sample acrylonitrile butadiene styrene, in examples of the present disclosure.

FIG. 3 illustrates stress versus strain experimental results of one example transient polymer blend, in an example of the present disclosure.

Figure 1A:
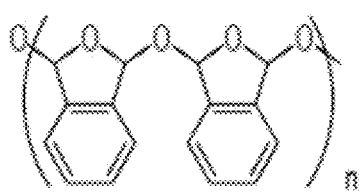
FIG. 1A depicts a structural formula of one configuration of transient polymer poly(phthalaldehyde), in an example of the present disclosure.

The figures depict various embodiments of the present disclosure for purposes of illustration only. Numerous variations, configurations, and other embodiments will be apparent from the following detailed discussion.

DETAILED DESCRIPTION

Overview

Transient polymer materials (sometimes referred to as "self-immolating" polymer materials) are polymer materials that decompose to a gaseous phase, a liquid phase, or a low-visibility particulate solid phase (e.g., a powder) upon exposure to a trigger that initiates the decomposition (equivalently, transient polymer depolymerization) of the transient polymer material. These decomposition products are less visually detectable than the bulk form of the polymer, which improves the convenience of disposal and reduces the probability of undesired detection. In one example, objects meant to be delivered in secret can decompose from a visually observable bulk object (e.g., a parachute, a box or package, an aerial vehicle) into a less detectable solid, liquid, or gaseous decomposition product.

In some examples, the trigger for the decomposition of the transient polymer material includes one or more of heat (e.g., a minimum temperature above which decomposition occurs), a chemical (e.g., an acid, base, free radical), or light. In some examples, the transient polymer material can decompose in response to specific wavelengths or ranges of wavelengths within the spectrum in sunlight. For example, some transient polymer materials can decompose in response to ultraviolet (UV) light.

Not all decomposition products have the same level of detectability. Solid decomposition products of transient polymer materials can be in particulate or powder form, and thus may still be visually detectable. Liquid and gaseous decomposition products are less detectable. Because of this reduced detectability compared to solid decomposition products, transient polymer materials that decompose to liquid and/or gaseous decomposition products may be more desirable for some applications than transient polymer materials that decompose to solid decomposition products.

The state of matter (solid, liquid, gas) of the decomposition product is not the only factor to consider when designing a device composed (in whole or in part) of a transient polymer material. The trigger employed to initiate decomposition (e.g., wavelength of light, temperature) can also be a factor to be considered in a design. Other design factors include the time required to fully decompose, as well as the physical, chemical, environmental (e.g., temperature, humidity, radiation, solvent exposure), and mechanical demands to be placed on a device fabricated from a transient polymer material.

Synthesizing a transient polymer material that meets all desired design criteria can be difficult. A particularly challenging set of design criteria are those for devices that are desired to be less detectable upon decomposition (e.g., decompose into liquid and/or gas phase decomposition products), desired to decompose in response to an optical trigger (e.g., a certain wavelength or range of wavelengths of light), and to have acceptable mechanical properties. Acceptable mechanical properties include toughness and bending compliance, with tensile strength on the order of megapascals (MPa) (Newtons/square meter ($N/m^2$)) to several gigapascals (GPa), an elongation to break that is at least 200%, and bending compliance that allows a resulting thin film of the material to be folded without plastic deformation or material failure. Furthermore, the transient polymer material preferably can be conveniently manufactured. While one transient polymer, poly(phthalaldehyde) ("PPHA"), has some of these desirable traits, development of a transient polymer material that accomplishes all of these desired criteria has been challenging. While conventional, non-transient polymer materials can be modified with fillers, plasticizers, and blended with other polymers, the presence of these other, non-transient materials can degrade the transience properties of the transient polymer material such that the depolymerization of the transient polymer material is beyond the desired design criteria (e.g., the decomposition product is more detectable or depolymerizes slowly (e.g., more than 8 hours, 10 hours, or even longer).

Thus, in accordance with techniques described herein, embodiments are described that comprise polymer blends of a transient polymer material and one or more of a polymer comprising an acrylonitrile group (e.g., acrylonitrile butadiene styrene (ABS), styrene acrylonitrile (SAN)), and a polyester polymer that decompose into a liquid phase decomposition product. In some cases, two or more polyester polymers can be used. In some embodiments, the polyester polymer (or one or more of the two or more polyester polymers) can have low glass transition temperature (e.g., less than 0° C.). For embodiments in which multiple polyester polymers are used in the blend, the polyester polymers can all be miscible with the transient polymer material but be immiscible with one another. As used herein, "miscible" means the ability of the two or more components to form a uniform composition that may include uniformly distributed second and/or third phase regions in a first phase region.

At least some polymer blend embodiments as described herein have been shown to produce decomposition products in the liquid phase state of matter. This result is unexpected given that many polymers comprising an acrylonitrile group and many low glass transition temperature polyesters are solid at room temperature and thus would be expected to produce a solid material when upon decomposition of the transient polymer material with which they were blended. Furthermore, this result is unexpected also because the transience properties of transient polymer materials can be inhibited by the presence of non-transient components, whether small molecules, inorganic components, or polymeric components. In some examples, the mechanical properties (e.g., tensile strength, modulus) of the resultant blend are significantly increased over PPHA homopolymer and other transient polymer materials. The polymer(s) blended into the transient polymer material can sometimes have a higher elastic modulus and/or higher energy absorption relative to PPHA homopolymer. For at least this reason, blends described herein can not only produce liquid decomposition products upon depolymerization, but can also have increased tensile (and/or yield) strength, increased elastic modulus, and increased toughness relative to PPHA homopolymer and other transient polymer materials. Toughness is defined herein as the amount of energy absorbed by the material prior to failure, and can be determined by integrating an area under a stress vs. strain curve. As used herein, the phrase "liquid phase decomposition products" is understood to mean a mixture of one or more liquid phases of phthalaldehyde monomer, polyester polymer, acrylonitrile containing polymer, plasticizers, various small molecules and other transient polymer material constituents solvated or suspended in these liquid phases.

Prior to providing descriptions of transient polymer blends of the present disclosure, transient polymer materials are described.

Transient Polymer Materials

Transient polymer materials can include one or more transient homopolymers, copolymers, (examples of which are described below), and one or more additives, such as an ionic liquid (that can act as a plasticizer), a filler, a sensitizer, a photo acid generator, and a plasticizer (examples of which are described below).

In some embodiments described herein, an ionic liquid can be present in a weight percentage relative to an entire polymer blend composition of from 25 weight % to 55 weight %. In some cases, the weight proportion of ionic plasticizer relative to the transient polymer material can be from 15 wt. % to 60 wt. % Other types of plasticizer may be added in addition to the ionic plasticizer in a proportion of the transient polymer material of from 5 wt. % to 30 wt. %.

Figure 1B:
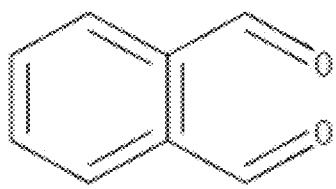
FIG. 1B depicts a structural formula of phthalaldehyde monomer, in an example of the present disclosure.
Figure 1C:
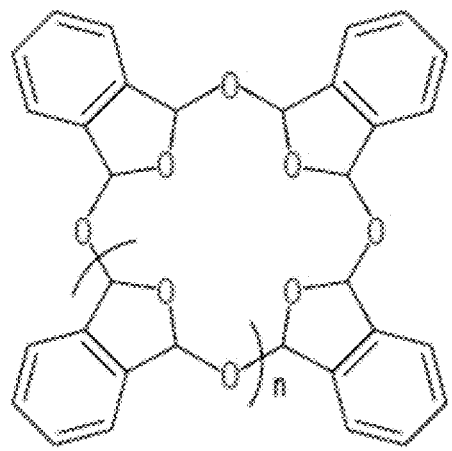
FIG. 1C depicts an alternative structural formula of a crown-type configuration of transient polymer poly(phthalaldehyde), in an example of the present disclosure.

As mentioned above, one example of a transient polymer is that of poly(phthalaldehyde) ("PPHA") having a chemical composition of $(C_6H_4(CHO)_2)_n$. An example structure of PPHA is shown in FIG. 1A. The structure of one monomer (phthalaldehyde or "PHA") is shown in FIG. 1B. In some cases, PPHA is polymerized from PHA to form a molecule having a crown-type conformation, as shown in FIG. 1C. PHA monomer has a ceiling temperature of, in some examples, approximately −42° C. (+/−5%). As explained above, this low ceiling temperature facilitates decomposition above ambient atmospheric temperatures at most times of the year in temperate and tropical climate zones.

Other example transient polymers include, but are not limited to, polyaldehydes, polycarbonates, polycarbamates, polysulfone, as well as copolymers and polymer blends of these transient species. The present disclosure often uses PPHA as an example of a transient polymer for convenience of explanation, but it will be appreciated that other transient polymers (or copolymers of combinations of transient monomers and/or blends of transient polymers) can be used in examples of the present disclosure. Other examples of transient polymers (including polymers and depolymerization components) can be found in US Patent Application Publication No. 2017/0306199, US Patent Application Publication No. 2018/0155483, U.S. Pat. Nos. 8,999,629, and 8,956,805, all of which are hereby incorporated herein by reference herein in their entireties.

One factor in selection of a transient polymer for use as a component in a transient polymer material (in addition to the ceiling temperature above which the polymer tends to depolymerize or otherwise revert to its constituent monomers) is the vapor pressure of a monomer of the transient polymer. Constituent monomers with a high vapor pressure are more likely to decompose into a gas phase upon depolymerization. Constituent monomers with a low vapor pressure are more likely to decompose into a liquid phase or a solid phase (e.g., a powder) upon depolymerization. The phthalaldehyde monomer has a vapor pressure of 0.0052 millimeters (mm) of Mercury (Hg) at 20° C. Based on this, it is generally expected that PPHA will decompose into a solid decomposition product (e.g., a powder, particles) near or below 20° C. Even though PPHA may have other desirable mechanical or transience properties, the expectation of a solid phase decomposition product can make PPHA materials undesirable for many applications because solid phase depolymerization products are more detectable than gas and/or liquid decomposition products.

As indicated above, the physical stability of a transient polymer of the present disclosure can be preserved by using a terminal group to prevent the polymer molecule from depolymerizing above the ceiling temperature. For linear conformation of PPHA, terminal groups can include, but are not limited to, 4-nitrophenyl chloroformate, allyl chloroformate, methyl chloroformate, and acetic anhydride. In some examples, a depolymerizing agent is included as an additive to the transient polymer material. While not wishing to be bound by theory, the depolymerizing agent can cause polymer chain scission at one or more locations within the polymer molecules. This reduces or eliminates the stabilizing effect of the terminating molecule or results in a direct chain attack, thus allowing the polymer to depolymerize or decompose into a powdery solid phase, a liquid phase, and/or a gas phase when above corresponding ceiling temperatures.

One type of depolymerization agent that can be included in transient polymer materials to promote decomposition upon triggering is a photo acid generator. In some examples, photo acid generator molecules are stable nonacidic molecules prior to exposure to a certain wavelength (or wavelengths) of light. Upon exposure to the certain wavelength of light, the photo acid generator molecule decomposes into an acid, thus producing protons that can attack polymer molecules and cause chain scission, as described above.

Figure 1D:
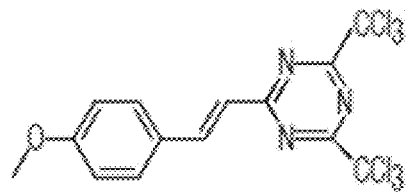
FIG. 1D depicts a structural formula for a photo acid generator MBTT, in an example of the present disclosure.

One example of photo acid generator is 2-(4-methoxystyryl)-4,6-bis(trichloromethyl)-1,3,5-triazine ("MBTT"). A representation of the chemical structure of MBTT is illustrated in FIG. 1D. MBTT produces an acid when exposed to wavelengths in the UV range, for example within a range of wavelengths up to and including $\lambda=379$ nm. A photon having an energy corresponding to $\lambda=379$ nm causes the MBTT molecule to decompose into two free radicals, one of which is chlorine (Cl). The chlorine will bond with hydrogen to form HCl, that in turn attacks cyclic PPHA, reducing it to its constituent monomer. Another example of a photo acid generator is 4-Isopropyl-4'-methyldiphenyliodonium Tetrakis(pentafluorophenyl)borate (Rhodorsil-FABA). Rhodorsil-FABA is an ionic photoacid generator composed of a cation and an anion. The cation portion can be activated through the absorption of radiation near a 248 nm UV wavelength. Upon activation, the anion potion will extract a hydrogen ion from the cation portion.

An ionic liquid (i.e., a salt in the form of a liquid at temperatures below 100° C.) can be included as a component in some embodiments of a transient polymer material of the present disclosure. An ionic liquid can lower the freezing point of decomposition products of the transient polymer. This can make it more likely that the decomposed transient polymer will decompose into a liquid form that is less detectable than a solid decomposition product. Examples of ionic liquids that can be combined with transient polymers and used in embodiments of the present disclosure include 1-butyl-1-methylpyrrolidinium bis(trifluoromethylsulfonyl) imide; 1-hexyl-1-methylpyrrolidinium bis(trifluoromethylsulfonyl)imide; and 1-octyl-methylpyrrolidinium bis(trifluoromethylsulfonyl)imide. These examples, among others, can lower the freezing point of PPHA decomposition products (or the decomposition products of other transient polymers described herein) to less than −20° C. or in some cases even less than −50° C. Other ionic liquids can be found in US Patent Application Publication No. 2018/0155483, which is incorporated by reference herein in its entirety.

In some examples, an optical sensitizer (also known as a "fluorophore") additive can be included with the photo acid generator to facilitate depolymerization of a transient polymer material. The optical sensitizer additive can absorb light in the visible spectrum and re-emit the absorbed energy in a wavelength that can cause the photo acid generator to generate acid, thus depolymerizing the transient polymer. Examples of optical sensitizers include, but are not limited to anthracene, tetracene, pentacene, 1,8-dimethoxy-9,10-bis (phenylethynyl) anthracene ("DMBA"), 5,12-bis(phenylethynyl)tetracene ("BPET"), and 6,13-bis(3,4,5-trimethoxyphenylenthynyl)pentacene ("BTMP"), 1-Chloro-4-propoxythioxanthone (CPTX), E,E-2,5-bis[2-(3-pyridyl) ethenyl]pyrazine (BPEP). Structures of these three example compounds are illustrated in FIG. 2E. Other examples of optical sensitizers include Anthracene, Tetracene, Pentacene, 1-Chloro-4-propoxythioxanthone ("CPTX"), and E,E-2,5-bis[2-(3-pyridyl)ethenyl]pyrazine ("BPEP").

Figure 1E:
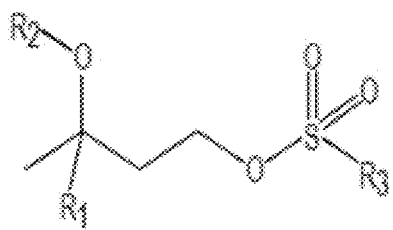
FIG. 1E depicts a structural formula for an acid amplifier that facilitates regeneration of protons after polymer chain scission, thus enhancing the effect of photo acid generators in depolymerization of a transient polymer material, in an example of the present disclosure.

In some examples, an acid amplifier may also be incorporated as an additive. Acid amplifiers facilitate regeneration of protons after chain scission, thus increasing the rate at which a transient polymer depolymerizes. An example structure of an acid amplifier appears in FIG. 1E.

As indicated above, transient polymer compositions (examples of which are described above), even those filled with silica, carbon black, or other common polymeric filler materials, sometimes cannot meet all desired performance criteria. In particular, a combination of less detectable decomposition products and desired mechanical strength and toughness are difficult to achieve. Embodiments described in the following section accomplish this long sought, but previously elusive, combination of properties.

Transient Polymer Blends with Improved Mechanical Properties and Reduced Detectability While polymer blends have been used to accomplish a set of desired properties in commercially available polymers, there are challenges to successfully blending other polymers with transient polymer materials. For example, introducing rubber or higher-elastic modulus polymer materials into a transient material formulation can be difficult. In some situations, many commercially available polymers with desirable mechanical properties have properties that are undesirable for transient polymer blending and/or processing. For example, some commercially available polymers may be resistant to solvents used to process transient polymer materials. While tetrahydrofuran (THF)) is the solvent most typically used for solvating PPHA, some commercially available polymers that might otherwise have desirable properties are not soluble in THF (e.g., polyethylene, polypropylene) and thus are not suited for blending and/or manufacturing with PPHA. In another example, higher modulus polymers with an elastic component might normally be considered candidates for blending with a transient polymer material to increase toughness of the blend. Examples of a polymer with an elastic component include high impact polystyrene ("HIPS") and butadiene-styrene copolymers. However, these materials are immiscible with PPHA and will phase separate when added to a solution of PPHA-based transient polymer material dissolved in THF, thus reducing manufacturability and ultimately rendering fully phase separated material that is not thoroughly and uniformly blended and that lacks the desired mechanical properties and transience properties.

Some polymers that include an acrylonitrile group are good for producing transient polymer blends with PPHA. Some polymers that include an acrylonitrile group are miscible with PPHA, can be dissolved by THF (a good solvent for PPHA) and also have a higher elastic modulus than PPHA. Thus, some polymers that include an acrylonitrile group can be blended with PPHA-based transient polymer materials to improve the mechanical properties. One example of such a polymer is acrylonitrile butadiene styrene (ABS), which has good solubility in THF, a high elastic modulus, and good toughness. Experimental results have shown that ABS, added in concentrations up to 20% by weight of a total blend of ABS and a PPHA transient polymer material, will not adversely affect transience performance of a PPHA transient polymer material.

Polymer blends of PPHA with miscible polymers that include an acrylonitrile group and that are soluble in solvents also used for PPHA processing (e.g. tetrahydrofuran (THF)) have been found to have beneficial properties. Based on experimental evidence, polymers that include an acrylonitrile group appear to prevent phase separation of the acrylonitrile containing polymer from the PPHA and allow a homogenous composition and microstructure. In addition to ABS, another example of this type of polymer than can be conveniently blended with PPHA using THF is styrene acrylonitrile ("SAN"). Other polymers including an acrylonitrile group can also be blended with PPHA, as will be appreciated in light of the present disclosure.

The polymers described herein, whether PPHA (or other transient homopolymer), an acrylonitrile containing polymer, or a polyester (embodiments of which are described below) can have molecular weights in any of the following ranges: from 10,000 grams/mole (g/mol) to 1,000,000 g/mol; from 10,000 g/mol to 500,000 g/mol; from 100,000 g/mol to 500,000 g/mol; from 250,000 g/mol to 500,000 g/mol; from 500,000 g/mol to 1,000,000 g/mol; and from 750,000 g/mol to 1,000,000 g/mol. More specifically, in some examples PPHA can have a molecular weight within any of the following ranges: from 300,000 g/mol to 600,000 g/mol; from 300,000 g/mol to 500,000 g/mol; from 500,000 g/mol to 600,000 g/mol; from 400,000 g/mol to 500,000 g/mol; from 500,000 g/mol to 1,000,000 g/mol; and from 750,000 g/mol to 1,000,000 g/mol. More specifically, for some embodiments in which a polyester polymer is blended with PPHA (and optionally an acrylonitrile containing polymer), a first polyester can have a molecular weight within any of the following ranges: from 50,000 g/mol to 200,000 g/mol; from 50,000 g/mol to 100,000 g/mol; from 75,000 g/mol to 150,000 g/mol; and from 150,000 g/mol to 200,000 g/mol. For examples in which a second polyester having a $T_g$ greater than 0° C. is used with a first polymer that has a $T_g$ less than 0° C., the second polyester polymer can have a molecular weight within any of the following ranges: from 10,000 g/mol to 100,000 g/mol; from 25,000 g/mol to 100,000 g/mol; and from 25,000 g/mol to 75,000 g/mol. Molecular weights in any of these ranges promote polymer molecule entanglement to a degree that promotes mechanical properties (e.g., elastic modulus, yield stress, ultimate tensile stress) sufficient to withstand the forces in the high MPa to low GPa range. Furthermore, in some example, a polydispersity index of transient polymers of the present disclosure can be as low as 1.1 and has high as 2.6.

At least some of the embodiments described herein (as well as the variations thereof that will be apparent in light of the present disclosure) are able to produce liquid decomposition products. In some of the examples, the extent of solid to liquid decomposition can include at least 50%, at least 80%, at least 90%, or at least 99% of the volume of the solid transient polymer blend. Decomposition times from a solid material to over 95% liquid decomposition product can be within any of the following ranges under the following conditions: less than 30 minutes at temperatures of at least 30° C. and a UV index of greater than 6; less than 60 minutes at temperatures of at least 20° C. with a UV index of from 3 to 7; less than 180 minutes at temperatures less than 20° C. and a UV index of from 0.1 to 5; and less than 480 minutes at temperatures less than 20° C. with a UV index from 0.1 to 3. It will be appreciated that these are presented only to illustrate the fast rate of decomposition under conditions that encourage decomposition (higher temperature and higher decomposition trigger exposure) and even under conditions that are less favorable to decomposition. It will further be appreciated that similar decomposition times can be produced for transient polymer blends that rely on different transience triggers (e.g., non-flame heating, chemical exposure, biological agent exposure).

Table 1 lists experimental results for example polymers that were analyzed for compatibility and mechanical property improvement when blended with PPHA.

TABLE 1

| Blended with PPHA | Phase Separation Observed | Effect on Mechanical Properties |
|---|---|---|
| Butadiene | Yes | Adverse |
| High Impact Polystyrene | Yes | Adverse |
| Styrene Butadiene Rubber | Yes | Adverse |
| Styrene Acrylonitrile | No | Increased Modulus Increased Yield Strength |
| Acrylonitrile Butadiene Styrene | No | Increased Modulus Increased Yield Strength Increased Toughness |

As summarized in Table 1, ABS blended with a PPHA transient polymer material increased both elastic modulus and yield strength, as well as increased toughness. Furthermore, this blend composition produced a liquid phase decomposition product. While not wishing to be bound by theory, it is believed that these benefits may be due to the presence of butadiene components (a rubberizing agent) in the ABS. Blending SAN with PPHA resulted in an increase to the elastic modulus and yield strength of a PPHA transient material. This blend also produced liquid phase decomposition products.

Another advantage of blending an acrylonitrile containing polymer with PPHA is the improvement in the ability of the blended PPHA/acrylonitrile polymer transient material to be solvent bonded with weak solvents such as ketone solvents (e.g., acetone and methyl ethyl ketone) as well as ester solvents (such as ethyl acetate). Solvent bonding is a commonly used bonding technique for fabrication and assembly of plastic components. Because acrylonitrile containing polymer/PPHA blends can be solvent bonded with solvents that are less flammable, less hazardous to human health, and more environmentally benign than other types of solvents (e.g., strong PPHA solvents, like THF or methylene chloride), the blended material has an improved manufacturability relative to PPHA transient polymer materials without an acrylonitrile containing polymer.

In some examples of a blended polymer material of the present disclosure, the proportion of a transient polymer material can be within any of the following ranges: from 20 weight (wt.) % to 98 wt. %; from 50 wt. % to 60 wt. %; from 60 wt. % to 80 wt. %; and from 70 wt. % to 80 wt. %. The proportion of the transient polymer material (prior to blending with other polymers as described herein) can include PPHA (or other transient homopolymer) in any of the following ranges: from 20 weight % to 99 wt. %; from 30 wt. % to 50 wt. %; from 30 wt. % to 60 wt. %; and from 25 wt. % to 55 wt. %. The remaining portion of the transient polymer material can include ionic and non-ionic liquid plasticizers, fillers, photoactive molecules, among others. Some of these additional components are described below in more detail.

In some examples of a blended transient polymer material, the proportion of an acrylonitrile containing polymer can be within any of the following ranges: from 1 wt. % to 40 wt. %; from 1 wt. % to 10 wt. %; from 10 wt. % to 20 wt. %; and 15 wt. % to 20 wt. %. It will be appreciated that these values may be approximate within +/−5% due to normal measurement variation and error. The inclusion of an acrylonitrile containing polymer (e.g., ABS) in these proportions can reduce brittle film failures, increase toughness and yield strength, increase bending compliance and increase failure resistance to high strain rate and impulse (shock) loads without appreciably affecting transience performance upon exposure to the UV-wavelength light contained in sunlight.

In another embodiment of the present disclosure, PPHA transient polymer materials can be blended with one or more polyester polymers (some of which have a $T_g$ of less than 0° C.). In some embodiments, the one or more polyester polymers are miscible with PPHA so as to produce a homogenous polymer blend that may include uniformly distributed second (or third) phase regions in the first phase matrix. In embodiments in which multiple polyester polymers are used, the polyester polymers can be miscible with the PPHA (or other transient polymer material) and immiscible with one another. In some examples in which multiple polyester polymers are blended with PPHA, a first polyester polymer can have a $T_g$ less than 0° C. and a second polyester polymer immiscible with the first polyester polymer can have a $T_g$ greater than 0° C. Additional polyester polymers can be added in some examples. It will be appreciated that the one or more polyester polymers can be blended with PPHA with or without the acrylonitrile containing polymer described above.

As with the PPHA/acrylonitrile polymer blend, polymer blends of PPHA and two or more polyester polymers, with at least two of the polyester polymers immiscible with one another, (optionally blended with an acrylonitrile containing polymer) also have liquid phase decomposition products. Polyester polymers blended with PPHA are generally solid at room temperature and therefore it is surprising and unexpected that the decomposition products of PPHA/polyester (optionally blended with an acrylonitrile containing polymer) blends are liquid. This is particularly surprising given that the presence of non-transient polymers in a transient polymer material can reduce, degrade, slow or otherwise inhibit the decomposition of the transient polymer material.

Because some polyester polymers can be flexible and may have long elongations to fracture (e.g., over 100% elongation), polyester polymers blended with PPHA can have improved mechanical properties over an unblended PPHA transient material. In some ways, the presence of polyester in PPHA has an effect on the mechanical properties and thermal properties similar to that observed by the addition of small molecule plasticizers. That is, adding polyester polymers as a blending component to PPHA (and optionally PPHA with an acrylonitrile containing polymer) can reduce the glass transition temperature ($T_g$), increase elongation (e.g., percent strain) to fracture, and increase the flexibility (e.g. compliance) of the blended material. An advantage in some cases of blending PPHA with a polyester polymer (and in particular, two or more polyester polymers, at least two of which are immiscible with each other) is that the blended polymer can possess a smaller decrease in yield strength per unit increase in elongation to break when compared to PPHA that includes only a small molecule plasticizer. This can increase the toughness of the PPHA/polyester blend material relative to a plasticized version of PPHA or an unblended PPHA transient material.

Examples of polyester polymers having a glass transition temperature of less than 0° C. and that can be blended with PPHA (that optionally includes an acrylonitrile) polymer follow in Table 2A. Examples of polyester polymers having a glass transition temperature of greater than 0° C. and that can be blended with PPHA (that optionally includes an acrylonitrile polymer) and that may also include a polyester polymer from Table 2A follow in Table 2B. It will be appreciated that these are examples only and PPHA/polyester blends are not limited to the following example polyester polymers.

TABLE 2A

Example Polyester Polymers for Blending with PPHA
(Tg less than 0° C.)

Polycaprolactone (PCL)
Polybutylene adipate co-terphthalate (PBAT)
Polybutylene succinate (PBS)
Polybutylene succinate adipate (PB SA)
Polyhydroxyalkanoates (PHA)
Poly (3-hydroxybutyrate-co-3-hydroxyvalerate) (PBHB)
Poly(ethylene succinate) (PES)
Poly(ethylene adipate) (PEA)

TABLE 2B

Example Polyester Polymers for Blending with PPHA
(Tg greater than 0° C.)

Polylactid acid (PLA)
Thermoplastic starch (TPS)
Poly-beta-hydroxybutyrate (PHB)
Polyhydroxybutyrate valerate (PHBV)

As indicated above, some embodiments of the present disclosure include multiple polyesters that are blended with PPHA (optionally including an acrylonitrile containing polymer) to produce a polymer blend. For these embodiments, the multiple polyesters are miscible with PPHA but immiscible with one another.

For examples in which two polyesters are used, the following Table 3 illustrates pairs of immiscible polyesters that are miscible with PPHA and have been used to form a homogenous blend, as described herein. These are provided as examples only and other polyesters (e.g., polymethylmethacrylate (PMMA)) can be substituted or paired in any of a number of combinations, as will be appreciated in light of the present disclosure.

TABLE 3

| Polyester #1 | Polyester #2 |
| --- | --- |
| Polycaprolactone (PCL) | Polybutyrate adipate co-terephthalate (PBAT) |
| Polycaprolactone (PCL) | Polylactic acid (PLA) |
| Polycaprolactone (PCL) | polybutylene succinate adipate (PBSA) |
| Polycaprolactone (PCL) | Thermoplastic starch (TPS) |
| Polycaprolactone (PCL) | Poly (3-hydroxybutyrate-co-3-hydroxyvalerate) (PBHB) |
| Polylactic acid (PLA) | Polyhydroxybutyrate (PHB) |
| Polylactic acid (PLA) | Polybutylene succinate adipate (PBSA) |
| Polylactic acid (PLA) | Poly (3-hydroxybutyrate-co-3-hydroxyvalerate) (PBHB) |
| Polylactic acid (PLA) | Polybutylene succinate (PBS) |
| Polylactic acid (PLA) | Thermoplastic starch (TPS) |
| Polyhydroxybutyrate (PHB) | Polyether sulfone (PES) |

These immiscible polyesters can be dissolved in any of a number of common solvents such as dichloromethane, chloroform, and THF, for subsequent mixing with PPHA dissolved in the same solvent or a compatible solvent.

While not wishing to be bound by theory, it is believed that blending PPHA with a polyester polymer having a subzero glass transition temperature may have a beneficial effect on the mechanical properties of the PPHA/polyester blend. When operating above the subzero glass transition temperature, the polyester polymers when blended with PPHA (and optionally an acrylonitrile trial containing polymers such as ABS or SAN), can improve the ability of the blend to have high toughness and long elongation to break across a wide range of operating temperatures (e.g., from 0° C. to 100° C.). While not wishing to be bound by theory, it is believed that this benefit is because the ductile to brittle fracture transition temperature is generally close to the glass transition temperature. In some examples, it has been demonstrated that the utilization of a low $T_g$ polyester additive will increase bending compliance, increase toughness and increase elongation to break for temperatures as low as −40° C. relative to a transient polymer material formulation that lacks a polyester polymer.

In some examples of a blended transient polymer material, the proportion of a polyester containing polymer can be within any of the following ranges: from 1 wt. % to 40 wt. %; from 1 wt. % to 10 wt. %; from 10 wt. % to 20 wt. %; and 15 wt. % to 20 wt. %. It will be appreciated that these values may be approximate within +/−5% due to normal measurement variation and error. More specifically, the proportion of a first polyester can be within any of the following ranges: 1 wt. % to 50 wt. %; 5 wt. % to 40 wt. %; 10 wt. % to 25 wt. %. The proportion of a second polyester, immiscible with the first polyester, can be within any of the following ranges: 1 wt. % to 30 wt. %; 10 wt. % to 25 wt. %; 15 wt. % to 30 wt. %.

Fabrication Techniques

Embodiments of the present disclosure, particularly those that use PPHA as the transient polymer material, can be synthesized by dissolving the constituent polymers in solvents. In one technique, PPHA transient polymer material (e.g., PPHA homopolymer with various other components described above such as ionic liquids, photosensitizers, among others) can be dissolved in THF at a desired concentration to produce the blended composition above. Another solution can be prepared of the other polymer using a good solvent for that polymer that is also compatible (i.e., miscible) with THF. For example, PCL can be dissolved in DCM (dichloromethane) in room temperature at a desired concentration. In some examples, PBAT (in an equal weight to PCL) is also dissolved at room temperature in the PCL/DCM solution. As described below in the Experimental Examples section (Table 5), PBAT can facilitate liquid phase decomposition products.

The PPHA solution and PCL (and optionally PCL/PBAT) solutions can be mixed so as to produce a solution with the desired molar or weight percentages of the polymers. This solution can then be processed into a film using any appropriate film formation technique. These techniques include doctor blade, film coating, spin casting, die casting, and drop casting.

Alternatively, all of the preceding polymers can be dissolved in a common solvent (e.g., DCM) in a desired proportion and then processed into a film using known techniques.

The above techniques can be applied equally to the fabrication of a PPHA/ABS solution, with ABS being dissolved in THF or DCM instead of PCL. Analogous techniques can be used.

While PPHA cannot be melt processed, other components of the polymer blend can be melt processed. For example, films of PBAT and PCL, which are immiscible with one another, can be heated to temperatures from 100° C. to 150° C. to form a composite structure. This composite structure can then be dissolved in a solvent (THF) and subsequently mixed with PPHA as described above. Similarly, PBAT and PCL (as well as other miscible combinations) can be mixed using extrusion mixing and subsequently processed according to the techniques described above.

Analogous techniques can be used for any of the constituent polymer materials described herein.

EXPERIMENTAL EXAMPLES

Figure 5:
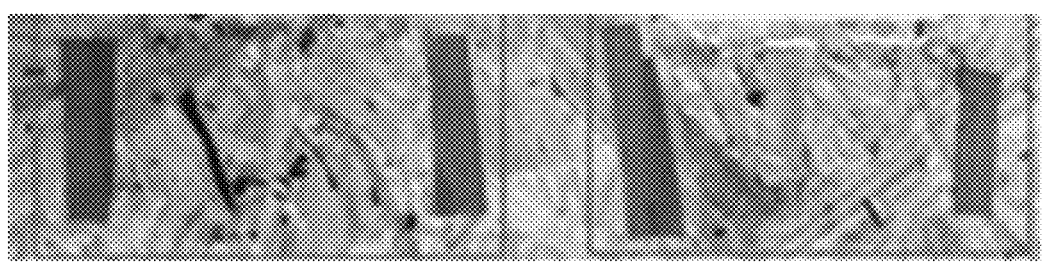
FIG. 5 illustrates transience experimental results of two transient polymer blends composed of poly(phthalaldehyde)-based transient polymer materials and acrylonitrile butadiene styrene, in examples of the present disclosure.

In some experimental examples, it was found that the inclusion of ABS in as little as 1 weight % relative to the weight of the PPHA in a transient polymer blend can increase the tensile modulus over 80% and increase the yield strength by 33% compared to a transient polymer material composed of PPHA alone. With 1 wt. % added ABS (relative to the weight of PPHA), the tensile modulus was increased from 165 MPa (of the un-blended PPHA transient polymer material) to 292 MPa and the yield strength was increased from 5.25 MPa (of the un-blended PPHA transient polymer material) to 7 MPa. It was found that ABS could be added in quantities that varied from as little as 1% by weight of the base PPHA up to 100% (i.e., equal amounts of ABS and PPHA), or more, in a transient polymer material that also contained ionic liquid and phthalate plasticizer, with the various mechanical properties increasing with increasing proportion of ABS while still producing liquid decomposition products (as shown in FIG. 5).

Furthermore, it was shown that the time of decomposition is not affected by the presence of even high percentages of ABS. In one example, a 120 µm thick film with 20 weight % of ABS and 80 weight % of PPHA transient polymer material was shown to have equivalent transience performance to a transient film of the same thickness with no added ABS. In this example, both the ABS/PPHA blend and PPHA-only films were exposed to sunlight on an overcast, 80° F. day. Both films first exhibited signs of PPHA depolymerization after 4 minutes and completed depolymerization and decomposition into a liquid form within 20 minutes. Similar results were demonstrated at 10% by weight of ABS.

Example decomposition products are shown in FIGS. 2A-2F for a variety of compositions of PPHA/PCL/ABS blends (the dark strips at the top and bottom of the samples are adhesive tape used to secure the sample to an underlying wood substrate). The compositions and the associated figure numbers are shown below in Table 4. The percentages of PCL designated in the figures refer to the percentage of PCL relative to the percentage of PPHA. For example, FIG. 2F is designated as "100% PCL" which means that the PPHA and PCL proportions are equal in the sample.

TABLE 4

|  | FIG. 2A | FIG. 2B | FIG. 2C | FIG. 2D | FIG. 2E | FIG. 2F |
| --- | --- | --- | --- | --- | --- | --- |
| PPHA | 36.48% | 35.20% | 29.49% | 31.84% | 34.59% | 27.46% |
| PCL | 3.65% | 3.52% | 22.12% | 15.92% | 8.65% | 27.46% |
| ABS | 0.00% | 3.52% | 0.00% | 0.00% | 0.00% | 0.00% |
| BMP | 40.86% | 39.42% | 33.03% | 35.66% | 38.74% | 30.76% |
| BEHP | 14.59% | 14.08% | 11.80% | 12.73% | 13.84% | 10.99% |
| FABA | 3.65% | 3.52% | 2.95% | 3.18% | 3.46% | 2.75% |
| Anthracene | 0.77% | 0.74% | 0.62% | 0.67% | 0.73% | 0.58% |

"BMP" is dimethyl phthalate. "BEHP" is bis(2-ethylhexly) phthalate. As shown in FIGS. 2A and 2B the transient polymer material decomposed to liquid phase products that lightly discolored the underlying wood sample substrate. The samples depicted in FIGS. 2C and 2D produced a small amount of solid phase decomposition product. The samples depicted in FIGS. 2E and 2F both produced primarily solid decomposition products.

FIG. 3 illustrates a tensile stress-strain curve of a sample composed according to the following Table 5.

TABLE 5

First Example Composition of PPHA/ABS/PCL 28.08 wt-% polyphthalaldehyde (PPHA)
11.23 wt-% PCL
4.49 wt-% Acrylonitrile butadiene styrene
39.88 wt-% of an ionic liquid plasticizer (1-butyl-1-methylpyrrolidinium bis(trifluoromethylsulfonyl)imide)
12.92 wt-% of a phthalate plasticizer (bis(2-ethylhexyl) phthalate) (BEHP)
2.81 wt-% a photo-acid generator (4-Isopropyl-4'-methyldiphenyliodonium Tetrakis(pentafluorophenyl)borate)
0.59% a photo-sensitizer (anthracene)

Mechanical properties for this composition were measured using a tensile test, the results of which are shown in FIG. 3. This composition a yield strength of 0.64 MPa, an elongation to break of 612% and stress at elongation to break or 1.68 MPa (100% strain per minute), and an elastic modulus of approximately 7.5 MPa as measured at room temperature (20° C.). These values are approximate to within +/−5% (according to normal variation and measurement tolerances/error). When tested at temperatures between −20° C. to −30° C., the example transient material above was foldable, crack resistant and resistant to crack propagation. The same formulation without the low-$T_g$ polyester (PCL) was found to be rigid and brittle at these temperatures. In comparison, to gain a similar elongation to break by replacing PCL with a small molecule plasticizer, yield strength is typically reduced below 0.12 MPa. Upon exposure to a high UV index sunlight (greater than 6), the sample composed according to Table 5 produced solid decomposition products.

A second example composition that was prepared for analysis is shown in Table 6. This composition is similar to that depicted in Table 5 except the composition of Table 6 included polybutylene adipate co-terphthalate (PBAT)—a second polyester in addition to and immiscible with PCL.

TABLE 6

Second Example Composition of PPHA/ABS/PCL/
$2^{nd}$ Immiscible Polyester Polymer 27.31 wt. % polyphthalaldehyde (PPHA)
10.93 wt. % PCL
4.37 wt. % Acrylonitrile butadiene styrene
2.73 wt. % polybutylene adipate co-terphthalate (PBAT)
38.79 wt. % of an ionic liquid plasticizer (1-butyl-1-methylpyrrolidinium bis(trifluoromethylsulfonyl)imide)
12.56 wt. % of a phthalate plasticizer (bis(2-ethylhexyl) phthalate)
2.73 wt. % a photo-package comprised of a photo-acid generator (4-Isopropyl-4'-methyldiphenyliodonium Tetrakis(pentafluorophenyl)borate)
0.57 wt. % a photo-sensitizer (anthracene)

Figure 4:
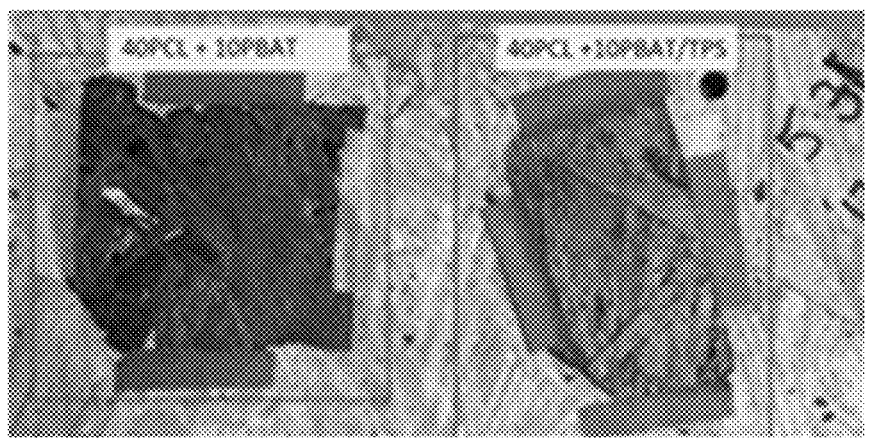
FIG. 4 illustrates transience experimental results of two transient polymer blends that include a poly(phthalaldehyde)-based transient polymer material, polycaprolactone, and either (1) polybutylene adipate co-terphthalate or (2) polybutylene adipate co-terphthalate and a thermoplastic starch, in embodiments of the present disclosure.

The mechanical properties of the composition of Table 6 were observed to be similar to the composition shown in Table 5. In addition to similar tensile strength, elastic modulus, and bending compliance, this material was also foldable, crack resistant and resistant to crack propagation at temperatures from −20° C. to −30° C. Advantageously and unexpectedly, when exposed to the same transience triggers as the composition in Table 5 (high UV index of greater than 6), the composition of Table 6 produced liquid decomposition products. Experimental transience results of PCL/PBAT/PPHA polymer blends shown in FIG. 4 illustrate the liquid phase decomposition products associated with this type of polymer blend. The right image in FIG. 4 illustrates a similar composition in which a combination of PBAT and TPS were mixed to be approximately 2.73 wt. % of the entire composition. As can be seen, both compositions decomposed to brown liquid decomposition products that discolored the underlying wood sample substrate.

FIG. 5 illustrates decomposition products of ABS/PPHA polymer blends that decomposed to transparent liquid decomposition products. The composition of these ABS-only PPHA transient polymer materials blended with ABS and not blended with a polyester are shown below in Table 7.

TABLE 7

| Weight Percent | Component |
|---|---|
| 29.93 | PPHA |
| 14.97 | ABS |
| 33.52 | BMP |
| 17.96 | BEHP |
| 2.99 | FABA |
| 0.63 | Anthracene |

FURTHER CONSIDERATIONS

The foregoing description of the embodiments of the disclosure has been presented for the purpose of illustration; it is not intended to be exhaustive or to limit the claims to the m precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A polymer blend comprising:
a transient polymer material; and
one or both of:
a polymer that includes an acrylonitrile group or
a polyester polymer having a glass transition temperature of less than 0° C.

2. The polymer blend of claim 1, wherein the transient polymer material comprises poly(phthalaldehyde) (PPHA).

3. The polymer blend of claim 1, wherein the polymer that includes the acrylonitrile group comprises acrylonitrile butadiene styrene (ABS) polymer.

4. The polymer blend of claim 3, comprising:
from 1 weight % to 33 weight % ABS polymer; and
from 80 weight % to 99 weight % transient polymer material,
wherein the total of the ABS polymer and the transient polymer material is 100 weight %.

5. The polymer blend of claim 1, wherein the polymer that includes the acrylonitrile group comprises styrene acrylonitrile (SAN).

6. The polymer blend of claim 1, wherein:
the polyester polymer comprises a first polyester and a second polyester compositionally different from the first polyester; and
the first polyester and the second polyester are immiscible with one another.

7. The polymer blend of claim 1, comprising:
from 20 weight % to 98 weight % transient polymer material;
from 1 weight % to 25 weight % of a first polyester; and
from 1 weight % to 10 weight % of a second polyester compositionally different from the first polyester and immiscible with the first polyester,
wherein the total composition is 100 weight %.

8. The polymer blend of claim 7, wherein the transient polymer material further comprises from 25 weight % to 60 weight % of an ionic liquid plasticizer, a non-ionic liquid plasticizer, or both.

9. The polymer blend of claim 7, wherein the first polyester and the second polyester are selected from one or more of the following combinations:
polycaprolactone (PCL) and polybutyrate adipate terephthalate (PBAT);
polycaprolactone (PCL) and polybutylene succinate adipate (PBSA);
polylactic acid (PLA) and a copolymer of 3-hydroxybutyrate and 3-hydroxyhexanoate (PBHB); and
polylactic acid (PLA) and polybutylene succinate (PBS).

10. The polymer blend of claim 7, wherein the first polyester has a glass transition temperature of less than 0° C. and the second polyester has a glass transition temperature greater than 0° C., and wherein the first polyester and the second polyester are selected from one or more of the following combinations:
polycaprolactone (PCL) and polylactic acid (PLA);
polycaprolactone (PCL) and thermoplastic starch (TPS);
polylactic acid (PLA) and polybutylene succinate adipate (PBSA);
polyhydroxybutyrate (PHB) and polyether sulfone (PES); and
polycaprolactone (PCL) and poly(3-hydroxybutyrate-co-3-hydroxyvalerate) (PHBV).

11. The polymer blend of claim 1, wherein:
the transient polymer material comprises:
from 20 weight % to 50 weight % polyphthalaldehyde (PPHA);
from 30 weight % to 48 weight % of an ionic liquid plasticizer;
from 10 weight % to 25 weight % of a phthalate plasticizer;
from 1 weight % to 5 weight % of a photo-active material comprising 4-Isopropyl-4'-methyldiphenyliodonium Tetrakis(pentafluorophenyl)borate and anthracene;
the polymer that includes the acrylonitrile group comprises from 1 weight % to 10 weight % of acrylonitrile butadiene styrene; and
the polyester polymer comprises from 5 weight % to 20 weight % of poly(caprolactone), and
wherein the total composition comprises 100 weight % of the polymer blend.

12. The polymer blend of claim 11, wherein the polymer blend exhibits a yield strength of approximately 0.64 MPa, an elongation to break of approximately 612%, and a stress at elongation to break of approximately 1.68 MPa, and wherein the preceding properties were measured at a strain rate of 100% strain per minute at 20° C.

13. The polymer blend of claim 1, wherein the polymer blend decomposes from a solid phase to a liquid phase upon exposure to a decomposition trigger in a period of less than 8 hours at temperatures below 20° C.

14. The polymer blend of claim 13, wherein at least 50 weight % of the polymer blend decomposes from a solid phase to a liquid phase in a period of less than 1 hour at a temperature of from 20° C. to 40° C.

15. A polymer blend comprising:
a transient polymer material;
a first polyester polymer having a first glass transition temperature of less than 0° C.; and a second polyester polymer compositionally different from the first polyester polymer and immiscible with the first polyester polymer.

16. The polymer blend of claim 15, wherein the polymer blend decomposes to a liquid phase upon exposure to a decomposition trigger.

17. The polymer blend of claim 15, wherein the transient polymer material comprises poly(phthalaldehyde) (PPHA).

18. The polymer blend of claim 15, further comprising at least one additional polyester polymer compositionally different from the first and second polyester polymers.

19. The polymer blend of claim 18, wherein one or more of the second polyester polymer and the at least one additional polyester polymer have a glass transition temperature greater than 0° C.

20. The polymer blend of claim 15, further comprising from 1 weight % to 10 weight % of an acrylonitrile butadiene styrene polymer, and wherein:

the transient polymer material comprises:
from 20 weight % to 50 weight % polyphthalaldehyde (PPHA);
from 30 weight % to 48 weight % of an ionic liquid plasticizer;
from 10 weight % to 25 weight % of a phthalate plasticizer;
from 1 weight % to 5 weight % of a photo-active material comprising 4-Isopropyl-4'-methyldiphenyliodonium Tetrakis(pentafluorophenyl)borate and anthracene;

the first polyester polymer has a glass transition temperature of less than 0° C. and comprises from 5 weight % to 25 weight %, and the second polyester polymer has a glass transition temperature of less than 10° C. and comprises from 1 weight % to 10 weight %, wherein the total composition comprises 100 weight %.

21. A polymer blend comprising:
a transient polymer material;
a first polyester polymer having a first glass transition temperature greater than 0° C.; and
a second polyester polymer compositionally different from the first polyester polymer, having a second glass transition temperature greater than 0° C. and immiscible with the first polyester polymer.

22. The polymer blend of claim 21, wherein the first polyester and the second polyester are selected from one or more of the following combinations:
polylactic acid (PLA) and polyhydroxybutyrate (PHB); and
polylactic acid (PLA) and thermoplastic starch (TPS).

23. The polymer blend of claim 8, wherein the ionic liquid plasticizer is 1-butyl-1-methylpyrrolidinium bis(trifluoromethylsulfonyl)imide.

24. The polymer blend of claim 11, wherein the ionic liquid plasticizer is 1-butyl-1-methylpyrrolidinium bis(trifluoromethylsulfonyl)imide.

25. The polymer blend of claim 20, wherein the ionic liquid plasticizer is 1-butyl-1-methylpyrrolidinium bis(trifluoromethylsulfonyl)imide.

26. The polymer blend of claim 11, wherein the phthalate plasticizer is bis(2-ethylhexyl) phthalate.

27. The polymer blend of claim 20, wherein the phthalate plasticizer is bis(2-ethylhexyl) phthalate.

28. The polymer blend of claim 20, wherein the first polyester polymer comprises polycaprolactone (PCL).

29. The polymer blend of claim 20, wherein the second polyester polymer comprises polybutylene adipate co-terphthalate (PBAT).

* * * * *